United States Patent [19]

Duprat et al.

[11] Patent Number: 4,668,352
[45] Date of Patent: May 26, 1987

[54] PROCESS AND APPARATUS FOR AUTOMATIC INCREASED SUCTION EXTRACTION ON ELECTROLYSIS TANKS FOR THE PRODUCTION OF ALUMINUM

[75] Inventors: George Duprat; Bernard Langon; Benoit Sulmont, all of de Maurienne, France

[73] Assignee: Aluminum Pechiney, France

[21] Appl. No.: 840,554

[22] Filed: Dec. 31, 1985

[30] Foreign Application Priority Data

May 3, 1984 [FR] France ................................ 84 07521

[51] Int. Cl.$^4$ ........................ C25C 3/06; C25C 3/20; C25C 3/22
[52] U.S. Cl. .................................... 204/67; 204/244; 204/247
[58] Field of Search ......................... 204/67, 244, 247

[56] References Cited

U.S. PATENT DOCUMENTS 4,051,224  9/1977  Duclaux et al. ...................... 204/67

Primary Examiner—Howard S. Williams
Attorney, Agent, or Firm—Jones, Day, Reavis & Pogue

[57] ABSTRACT

A process for automatically going into the mode for increased suction extraction of the gases emitted by the tanks of series for the production of aluminium by igneous electrolysis using the Hall-Heroult process, each tank being closed around its periphery by a plurality of removable covers which are disposed in substantially sealed relationship with each other and between each thereof and their support means on the periphery of the tank, the gases being collected over each tank by at least one duct connected to a centralized suction extraction system.

The temperature of the gases in the duct is continuously measured. Opening of at least one cover gives rise to an abrupt drop in temperature, which makes it possible to put the system into the increased suction extraction mode, which will be automatically stopped when, all the covers being closed again, the temperature of the gases will substantially resume its initial value.

The power required for the suction system is thus substantially reduced.

11 Claims, 2 Drawing Figures

PROCESS AND APPARATUS FOR AUTOMATIC INCREASED SUCTION EXTRACTION ON ELECTROLYSIS TANKS FOR THE PRODUCTION OF ALUMINUM

The present invention concerns a process and an apparatus for automatically providing for an increased suction extraction effect. It is particularly suited to the system for collecting effluents on electrolysis tanks for the production of aluminium, but it may be used for any system for collecting hot waste material in gaseous or dust form.

Aluminium is produced by the electrolysis of alumina which is dissolved in a cryolite bath. The electrolysis furnace which permits that operation to be carried out generally comprises:

a carbon cathode which is disposed in a steel casing and which is heat-insulated by refractory materials, and an anode or a plurality of anodes, made of carbon, which are immersed in the cryolite bath and which are regularly oxidized by the oxygen produced by decomposition of the alumina.

The current flows in a downward direction. Due to a Joule effect, the cryolite is maintained in a liquid state, at a temperature close to the solidification temperature thereof. The usual operating temperatures of the tanks are between 930° and 980° C. The aluminium produced is liquid and is deposited by gravity on the cathode which is fluid-tight. The aluminium produced or a part thereof is regularly drawn off by way of a pouring ladle and transferred into casting production furnaces. The worn-out anodes are regularly replaced by fresh anodes.

The operating voltage of such electrolyzers is generally between 3.8 and 5 volts. The daily production rate is proportional to the current intensity passing through the electrolyzer. That consideration has resulted in electrolyzers being disposed in series, comprising 150 to 250 tanks, up to the condition of voltage saturation of the sub-stations (700 to 1000 V). That aspect also resulted in an increase in the operating current intensity, by increasing the size of the electrolyzers.

The bath in the electrolysis tanks is a cryolite-base bath. A certain number of additives are used to increase the levels of current efficiency of the electrolysis operation. Such additives have the property of reducing the melting temperature of the mixture and/or reducing the degree of re-dissolution of the aluminium in the cryolite bath and/or enhancing the electrical conductivity of the electrolysis bath. Such additives are for example calcium, magnesium, lithium and aluminium fluorides.

Because of the high temperature used, the bath in the tanks progressively evaporates, giving rise to two disadvantages:

the substances emitted by the bath are fluorides in gaseous or particle form. When emitted in excessive quantities, they are considered to be pollutants which can cause environmental damage; and the evaporated fluorides must be replaced, which is a substantial item of expenditure in operating electrolysis tanks.

There is every interest in collecting the above-indicated effluents at the point at which the waste materials originate, that is to say, on the tank.

Many effluent collecting systems are in use, performing three functions:

(a) effluent collection on the tank: such collection is effected by means of manual or mechanized hatches which can be opened when operation of the tank so requires (for changing a worn-out anode or drawing off the aluminium produced);

(b) transportation of the fluorine-bearing effluents: this operation is effected in pipes which are connected to a fan. The tanks are generally connected in parallel to a common collecting system, balancing being effected by means of initial aerodynamic calculation of the sections of each pipe, or by virtue of using diaphragms or shutter members for producing a controllable closure effect;

(c) treatment of the effluents: the effluents may be washed, treated by means of electrostatic or sleeve-type filters, or treated in a dry condition, by fixing the fluorine on alumina which is then introduced into the electrolysis tank.

The levels of effluent collecting efficiency achieved attain 97 to 99% in modern installations.

It rapidly became apparent to the man skilled in the art that the level of efficiency in regard to collection of effluents in such systems was closely linked to the suction extraction rate admitted on each tank. It is clear that the capital investment costs and the subsequent operational costs (power for the fans and maintenance for the processing systems) increase with the suction extraction rate. The man skilled in the art takes the view that there is a virtually directly proportional relationship between the total level of expenditure in regard to collecting the effluents, and the mean suction extraction rate in $m^3$/second.

The covers for closing off the tanks or any doors provided thereon must be withdrawn (or opened or retracted) for operation of the tank, in particular for changing a worn-out anode or drawing off the liquid aluminium produced. The normal period for which the tank is opened may range from a few minutes to some tens of minutes. During that period of time, in order to maintain a high effluent collection rate, the suction extraction flow rate over the tank in question must be increased. For the rest of the time, with the covers being correctly put back into position in order to provide the appropriate sealing effect, the suction extraction flow rate may be reduced without thereby detrimentally affecting the level of effluent collection efficiency. Hereinafter, we shall use the term "covers" to denote both the covers in the strict sense and also doors giving access to the tank (for example the door of the casting region).

A double suction system must make it possible to optimize the level of efficiency of the effluent collection installation. The installation is then calculated by means of a mean flow rate which is close to the minimum level required. By means of a shutter system which is moved manually or mechanically, the flow rate of a given tank is temporarily increased whenever the tank operator is called upon to open a cover element.

Such a manual system suffers from the disadvantage of being highly constrictive as well as being liable to be forgotten or neglected by the operating personnel.

If the increased suction extraction effect is maintained without good cause over an excessive number of tanks, the flow rate at the other tanks is liable to drop to an excessive degree if the total flow rate of the suction extraction system remains constant. If the increased suction extraction effect is not brought into operation at the moment at which a part of the cover system of the tank is opened, fluorine-bearing effluents are released into the electrolysis hall.

The aim of the present invention is to automate the transition from the mode for normal suction extraction of the tank in which all the covers are closed to a temporary mode for increased suction extraction as soon as at least one cover is opened.

It should have been possible to provide an electrical switch for performing that function on each cover. However, bearing in mind that a modern 280,000 amps tank comprises around forty covers and that a series of tanks may comprise around a hundred and up to two hundred tanks, that would involve installing several thousands of swithes required to operate in the hostile environment of the tank (elevated temperature and corrosive gases), the reliability of which would have been doubtful and the cost price relatively high.

The present invention is based on the observation that, if the temperature of the gaseous flow entrained over each tank by the central suction extraction system is measured at a suitably selected point, it is found that, as soon as at least one cover is opened, there is an abrupt drop in the temperature of the gaseous flow, which drop may be up to 50° to 100° C. and which therefore, with total reliability and using simple, reliable and untroublesome means, can therefore put the installation into the increased suction extraction mode and then cause it to return to the normal suction extraction mode when the cover or covers has or have been put back into place.

More precisely, the present invention is a process for automatically going into the mode for increased suction extraction of the gases emitted by the tanks of series for the production of aluminium by igneous electrolysis using the Hall-Héroult process, each tank being closed around its periphery by a plurality of removable, slidable or liftable covers which are disposed in substantially sealed relationship with ach other and between each thereof and their support means on the periphery of the tank, the gases being collected over each tank by a number n of ducts (wherein n may vary from 1 to more than 10) connected to a centralized suction extraction system, characterised in that:

1. The temperature of the gases $t(i)$ is continuously measured in each of the n ducts (i). For the normal suction extraction flow rate and when the tank is closed, the temperature of the gases $t(i)$ will be close to a basic value $t_o(i)$.

2. Each gas temperature $t(i)$ is compared to a first upper reference value $t_1(i)$ which is lower than $t_o(i)$. When one at least of the measured temperatures becomes equal to or less than $t_1(i)$, which corresponds to the opening of at least one cover on the tank, the system goes into the increased suction extraction mode in response to the gas temperature crossing the threshold value $t_1(i)$.

3. Each gas temperature $t(i)$ in each of the n ducts (i) continues to be continuously measured. For the forced suction extraction rate (increased extraction) and when the tank is closed, each gas temperature $t(i)$ will be close to a basic value $t'_o(i)$ which is lower than $t_o(i)$.

4. Each gas temperature $t(i)$ is compared to a second lower reference value $t'_1(i)$ which is lower than $t_1(i)$. When all the measured temperatures $t(i)$ reach a value higher than $t'_1(i)$, which corresponds to the return to the tank closed situation, the system returns to the normal suction extraction mode in response to the temperature crossing the threshold value $t'_1(i)$.

The above-indicated threshold values essentially depend on the suction extraction flow rate and a simple and automatic way of regulating the threshold values is to make them dependent on the mean temperature of the gases which are subjected to suction extraction. The mean temperature is calculated from measurements in the n ducts or it is measured at the location of the general collecting manifold. That therefore provides for automatic control of the threshold values, irrespective of the suction extraction flow rate. The apparatus then does not require any intervention.

The invention also concerns an apparatus for carrying out the process for automatically going into the increased suction extraction mode, characterised in that it comprises:

a means for measuring the temperature of the gases $t(i)$ in each duct (i), a means for comparing $t(i)$ to a first threshold $t_1(i)$ and to a second threshold $t'_1(i)$, a means for automatically starting the increased suction extraction effect, a means for automatically stopping the increased suction extraction effect when $t(i)$ becomes equal to or higher than $t'_1(i)$ again, a means for controlling the gaseous flow rate in the duct of each tank, and a means for fixing the values of the thresholds $t_1(i)$ and $t'_1(i)$.

FIG. 1 shows a side view of part of a modern 280,000 amps electrolysis tank, designed by PECHINEY, in which two covers have been removed to permit replacement of a worn-out anode.

FIG. 2 shows a diagrammatic view in vertical section of the different suction extraction circuits of a 280,000 amps tank.

Figure 1:
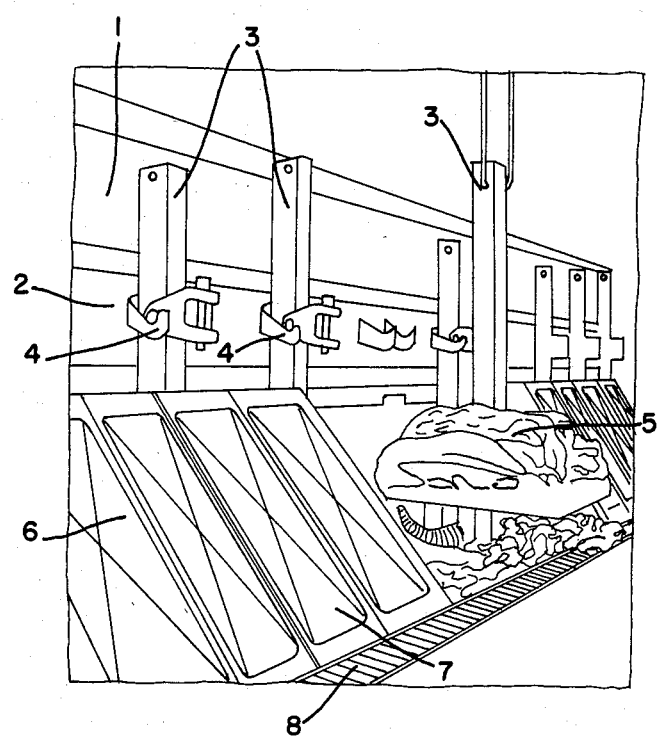
FIGS. 1 and 2 illustrate the manner of performance of the invention.

The electrolysis tank comprises a horizontal beam 1 which forms the superstructure of the tank and which supports the alumina feed hoppers (not shown), the anodic (positive) bar 2 and the anode support rods 3 which are locked on the anodic bar 2 by the means indicated at 4. The worn-out anode 5 has been removed after opening two covers 7, only one of which is shown in the drawing, the removed covers having been placed on respective sides of the opening on the other covers 6 which are in a closed condition. The grid 8 which communicates with the basement area provides for an intake of fresh air into the working area.

Figure 2:
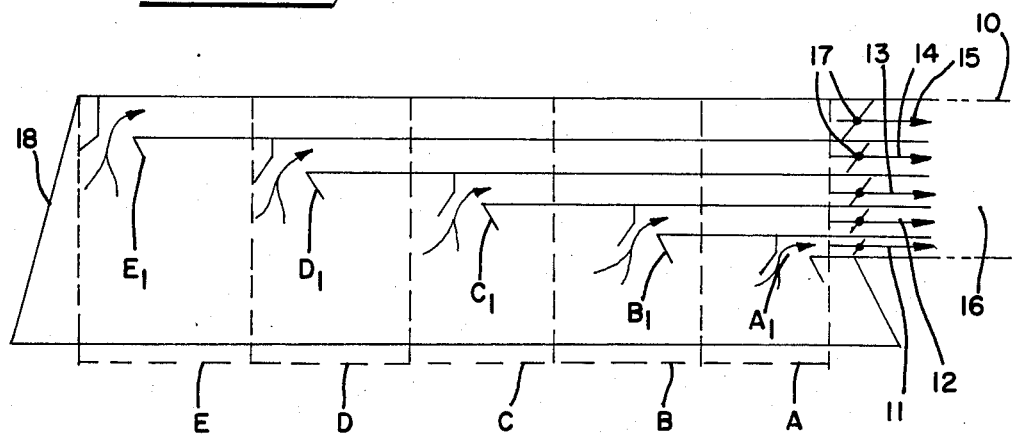

Referring to FIG. 2 which only shows the components which are essential for proper understanding of the invention, the tank is divided into five suction extraction regions denoted by references A to E, which correspond to the width of two covers, wherein each region has its own suction extraction conduit A1, B1, C1, D1 and E1, the dimensions of which are such as to ensure a predetermined flow rate in each thereof, related to the geometry of the tank.

The five ducts A1, B1, C1, D1 and E1 are combined in the general tank manifold 10 which is connected to the central suction extraction apparatus (not shown).

In the particular situation illustrated, thermocouples have been disposed at the outlet of each duct, at positions indicated at 11, 12, 13, 14 and 15, before they are combined in the general manifold 10. The thermocouples are for example of the nickel-chromium+alloyed nickel type of coaxial structure, which have a relatively high degree of sensitivity and which enjoy excellent resistance to the fluorine-bearing gases emitted by the tank.

The mean stabilized temperature was detected at the various thermocouples, under normal flow rate conditions:

(a) All the covers being closed, including the door 18 which is disposed at the head of the tank to give access to the point at which the liquid aluminium is drawn off (pouring door).

(b) Opening of a cover which is disposed successively in respective ones of the regions A to E as defined in FIG. 2, and the pouring door.

The results obtained are as follows:

| Temperature of the thermocouples t in °C. and measured variations Δ t °C. | | | | | |
|---|---|---|---|---|---|
| Covers and doors closed | 175 | 170 | 150 | 130 | 175 |
| Region A open    t | 80 | 100 | 130 | 150 | 130 |
| Δt | −95 | −70 | −20 | +20 | −45 |
| Region B open    t | 140 | 75 | 100 | 130 | 130 |
| Δt | −35 | −95 | −50 | 0 | −45 |
| Region C open    t | 150 | 125 | 70 | 120 | 120 |
| Δt | −25 | −45 | −80 | −10 | −55 |
| Region D open    t | 200 | 150 | 100 | 75 | 120 |
| Δt | +25 | −20 | −50 | −55 | −55 |
| Region E open    t | 220 | 170 | 120 | 70 | 80 |
| Δt | +45 | 0 | −30 | −60 | −95 |
| Pouring door open t | 230 | 180 | 150 | 70 | 55 |
| Δt | +55 | +10 | 0 | −60 | −120 |

It is found that the fact of opening any cover causes a drop in temperature of the air flow of greater than 50° C., at one at least of the points at which the thermocouples are disposed, the drop in temperature occurring with a response time of a few seconds. It is amply sufficient to generate, with total reliability, an electrical signal which will cause the system to go into the increased suction extraction mode.

A particularly simple and effective way of going into the increased suction extraction mode comprises providing each duct with a movable shutter or flap member 17 or a diaphragm, which is actuated by a jack. In the normal position, the shutter or flap member or diaphragm provides for a flow rate of N cubic meters per minute while in the completely open position, it gives a flow rate of X×N cubic metres per minute, wherein X is most broadly between 1.2 and 4 and preferably between 1.5 and 3.

The movable shutter or flap member may for example comprise a solid plate which is movable about an axis which is inclined to a greater or lesser degree with respect to the direction of the gas flow, according to the flow rate desired, or it may comprise a solid or perforated sliding plate which closes off a given percentage of the section of the duct and which is retracted to a greater or lesser degree in the increased suction extraction mode.

It is also possible to provide for proportional control of the opening, in dependence on the number of shutter or flap members opened, using known means for that purpose.

In the various situations involved, the installation is actuated by means of small jacks which operate outside the tank and the ducts thereof, and which therefore do not run a substantial risk of corrosion.

Gas flow rate control may also be effected by constricting or releasing a portion of the duct which is made of a flexible material that is resistant to the temperature involved and to the fluorine-bearing components, such as HYPALON or TEFLON elastomers (registered trademarks). The constriction effect is produced either mechanically or by the action of a hydraulic fluid in a double jacket arrangement which grips the flexible portion of the duct (valves known under the registered trademark "DOSAPRO").

In the case of electrolysis tanks of smaller dimensions, which have only a single suction extraction circuit, temperature measurement may be carried out at the outlet of the suction extraction circuit corresponding to the point 16 in FIG. 2. In such a case, the fall in temperature of the gas flow upon opening of a cover of the tank may not exceed 50° C., but it is still at least equal to 20° C. and in any case is amply sufficient with full reliability to ensure that the system is put into the increased suction extraction mode. Moreover, as has been found experimentally, in the case of 280 KA tanks, it is possible to measure the temperature at a single point (at 16) by positioning the thermocouple downstream of the region in which the five gas flows coming from the five collecting circuits converge. The level of sensitivity is reduced but it is still amply sufficient for carrying out the process.

When the cover or covers which has or have been removed is or are refitted, the temperature rises again rapidly to a value which, at least in the first few seconds, is not always equal to its initial value before the cover or covers was or were opened. Here too however, the rise in temperature is sufficiently rapid (a few seconds) and is of sufficient amplitude to produce the signal for the system to return to the normal suction extraction mode.

Therefore, on the basis of experience and in dependence on the size of the tanks and the particular features of the suction extraction circuits, the man skilled in the art will be able to determine a first temperature threshold $t_1$ for falling temperatures (when the system goes into the increased suction extraction mode) and a second temperature threshold $t'_1$ for rising temperatures (when the system returns to the normal suction extraction mode), which two thresholds may be the same or different.

In the case set forth in Table 1, the threshold for triggering off the system into the increased suction extraction mode could be fixed at 100° C. while the threshold for the return to the normal suction extraction mode could be fixed at 70° or 80° C.

Modern methods of processing the signal permit the above-described system to be perfected at low cost:

It is found in fact that the opening or closing of a cover results in a rapid variation in the temperature as measured in at least one of the collecting ducts. The variation in temperature reaches a value of several degrees per second.

Such variations, being substantial and quick, do not occur in the continuous mode of operaton (normal suction extraction, covers closed or increased suction extraction with at least one cover open).

It is therefore possible to use the differentiated signal $dT/dt$ to cause the system to go into or come out of the increased suction extraction mode.

Besides putting the system into the increased suction extraction mode, the process according to the present invention may perform a certain number of functions which are linked to operation of modern high-power electrolysis tanks. Besides causing the system to switch into the increased suction extraction mode, the fact that the temperatures cross the thresholds $t_1(i)$ and $t'_1(i)$ also cause a telltale light to be lit (and/or an acoustic warning device to be sounded) on a centralized control board for each group of tanks, thereby to indicate if at least one cover is opened (or has remained in an opened condition) on a given tank, as well as indicating how many covers are opened on a group of given tanks. For example, in a series of 150 tanks, wherein there is a respective suction extraction system associated with each of five groups each comprising 30 tanks, it is found that, when more than four covers are opened simultaneously in a single group, the suction extraction effect, which is switched into the increased suction extraction mode, begins to be insufficient. In that case it is possible to set off an alarm to warn the operating personnel that it is necessary to wait before opening a fifth (or n-th) cover.

It is possible in the same manner to detect the location of a cover which has not been properly closed again or which has been inadvertently left in the open position.

In summary, in a centralized control station, it is possible to govern the number of covers which are opened and closed, and the periods of time for which the covers are opened and closed. The signal which is produced by the temperatures crossing the thresholds $t_1(i)$ and $t'_1(i)$ is applied to a computer for controlling the process, which generates and can edit data regarding the operating situation, alarms and the various calculations involved in the process.

ADVANTAGES ACHIEVED BY THE INVENTION

Many advantages are achieved by carrying out the invention, as may be summarized below:

a saving of energy in regard to the consumption of the suction extraction system. A conventional system with a constant suction extraction effect of 3 m$^3$/s/per tank consumes about 300 kWh per tonne of aluminium produced, that is to say, a not inconsiderable fraction of the 12,500 to 13,500 required by the electrolysis operation. By carrying the invention into effect, it is possible to reduce the suction extraction flow rate to 2 m$^3$/per second and per tank, with peaks in the increased suction extraction mode at 3 m$^3$/s for about 5% of the time. The saving achieved may attain 60 to 90 kWh/tonne of Al;

a higher level of efficiency in regard to effluent collection, which is thus optimized in accordance with covers being opened;

correlated drop in fluorine-bearing waste materials which are not collected;

elimination of the danger of covers being inadvertently left in the open position, thereby relieving the responsibilities imposed on the operating personnel;

simplicity and robustness of the apparatus and, related thereto, a low level of capital investment cost;

the possibility of drawing up a thermal balance sheet for the tank: the flow rate of the gases and the gas temperature now being known, it is easy to deduce therefrom the thermal power entrained by the gases; and finally, as already indicated, the possibility of governing opening and closing of covers without any mechanical or electromechanical device which is connected to the covers themselves, therefore giving a high degree of reliability.

The invention was particularly conceived for series of tanks for producing aluminium by means of igneous electrolysis but it is applicable in the same fashion to any system for the suction extraction of hot gases in a closed installation which must be or which is accidentally liable to be opened with an intake of external cold air.

We claim:

1. A process for automatically increasing the rate of suction extraction of gases emitted by a series of tanks during production of aluminum by igneous electrolysis using the Hall-Heroult process, each tank being closed around its periphery by a plurality of removable covers which are disposed in substantially sealed relationship with each other and between each thereof and their support means on the periphery of the tank, the gases being collected over each tank by at least one duct connected to a centralized suction extraction system, said process comprising the steps of:
   (a) continuously measuring the temperature of the gases $t(i)$ in each of the ducts (i), the temperature $t(i)$ being close to a basic value $t0(i)$ when the tanks are closed and the suction extraction of the gases is at a first rate of suction extraction;
   (b) comparing each gas temperature $t(i)$ to a first upper threshold value $t_1(i)$ which is lower than $t0(i)$;
   (c) automatically increasing the rate of suction extraction when at least one of the measured temperatures $t(i)$ becomes equal to or less than $t_1(i)$, the lower temperature corresponding to the opening of at least one cover on the tank;
   (d) comparing each gas temperature $t(i)$ to a second threshold value $t'_1(i)$ which is lower than $t_1(i)$;
   (e) automatically returning the rate of suction extraction to its first rate when all the measured temperatures $t(i)$ reach a value higher than $t'_1(i)$, corresponding to a return of the tanks to a closed position.

2. A process according to claim 1 wherein the change from the first suction extraction rate to the increased suction extraction rate and vice-versa is effected by modifying the gas flow rate in the tank duct, controlled by the temperature crossing the temperature thresholds $t_1(i)$ and $t'_1(i)$.

3. A process according to claim 2 wherein the ratio of the gas flow rate in the increased suction extraction rate to the gas flow rate in the first suction extraction rate is between 1.2 and 4.

4. A process according to claim 1 wherein the crossing of the thresholds $t_1(i)$ and $t'_1(i)$ is detected causing a light to be lit and/or an acoustic signal to sound on a centralized board for a group of tanks.

5. A process according to claim 4 wherein the signal produced by crossing of the thresholds $t_1(i)$ and $t'_1(i)$ is passed to a computer for controlling processes for generating and editing operating situations, calculations and alarm data.

6. A process according to claim 1 wherein the ratio of the gas flow rate in the increased suction extraction rate to the gas flow rate in the first suction extraction rate is between 1.5 and 3.

7. An apparatus for automatically increasing the rate of suction extraction of gases emitted by a series of tanks during production of aluminum by igneous electrolysis using the Hall-Heroult process, each tank being closed around its periphery by a plurality of removable covers which are disposed in substantially sealed relationship with each other and between each thereof and their support means on the periphery of the tank, the gases being collected over each tank by at least one duct connected to a centralized suction extraction system, said apparatus comprising:

measuring temperature of the gases t(i) in each duct (i), a means for comparing t(i) to a first threshold $t_1(i)$ and to a second threshold value $t'_1(i)$, a means for automatically starting the increased suction extraction when t(i) is equal to or lower than $t_1(i)$, a means for automatically stopping the increased suction extraction effect when t(i) becomes equal to or higher than $t'_1(i)$ again, and a means for conrolling the gaseous flow rate in the duct of each tank.

8. Apparatus according to claim 1 wherein the means for measuring temperature is a thermocouple disposed in the duct of the tank.

9. Apparatus according to claim 7 wherein the means for controlling the gaseous flow rate comprises a flap or shutter member (17) which is disposed within the duct and which is movable about an axis substantially perpendicular to the axis of the duct and passing substantially through said axis.

10. Apparatus according to claim 7 wherein the means for controlling the gaseous flow rate comprises a flap member movable in a plane substantially perpendicular to the axis of the duct.

11. Apparatus according to claim 7 wherein the means for controlling the flow rate comprises a means for controlled constriction of a portion of the duct which comprises a flexible material.

* * * * *